US007210426B2

(12) United States Patent
Yeung

(10) Patent No.: US 7,210,426 B2
(45) Date of Patent: May 1, 2007

(54) COMPRESSIBLE PET CARRIER

(75) Inventor: Angie Yeung, Elmhurst, NY (US)

(73) Assignee: Style Living Corporation, Brooklyn, NY (US)

(*) Notice: Subject to any disclaimer, the term of this patent is extended or adjusted under 35 U.S.C. 154(b) by 0 days.

(21) Appl. No.: 10/339,746

(22) Filed: Jan. 9, 2003

(65) Prior Publication Data
US 2003/0127060 A1 Jul. 10, 2003

Related U.S. Application Data

(60) Provisional application No. 60/347,667, filed on Jan. 10, 2001.

(51) Int. Cl.
A01K 13/00 (2006.01)
(52) U.S. Cl. .................................. 119/497; 119/498
(58) Field of Classification Search ................ 119/497, 119/498, 500; D30/109; 224/576, 153–156, 224/578–580, 629, 631, 641, 161; 206/280; 190/103–107, 122, 127; 150/130
See application file for complete search history.

(56) References Cited

U.S. PATENT DOCUMENTS

| 4,141,320 | A | * | 2/1979 | Hatfield .................... 119/319 |
| 4,220,119 | A | | 9/1980 | Albright ....................... 119/19 |
| 4,593,841 | A | * | 6/1986 | Lange ........................ 224/153 |
| 4,852,520 | A | | 8/1989 | Goetz .......................... 119/19 |
| 4,951,818 | A | * | 8/1990 | Johnson ................... 206/315.1 |
| 4,977,857 | A | | 12/1990 | Slawinski ..................... 119/19 |
| 5,044,321 | A | | 9/1991 | Selph ........................... 119/96 |
| 5,170,745 | A | * | 12/1992 | Burdette, Jr. ................ 119/497 |
| 5,193,486 | A | | 3/1993 | Kitchens ....................... 119/94 |
| 5,265,719 | A | | 11/1993 | Wand ......................... 206/225 |
| 5,277,148 | A | * | 1/1994 | Rossignol et al. .......... 119/453 |
| 5,332,093 | A | * | 7/1994 | Littlepage ................... 206/457 |
| 5,377,887 | A | * | 1/1995 | Garcia ........................ 224/153 |
| 5,445,302 | A | * | 8/1995 | Holtorf ....................... 224/629 |
| 5,671,698 | A | | 9/1997 | Farrugia ..................... 119/497 |
| 5,701,843 | A | | 12/1997 | Lazides ...................... 119/496 |
| D398,082 | S | | 9/1998 | Martz ........................ D30/109 |
| D398,083 | S | | 9/1998 | Martz ........................ D30/109 |
| 5,832,874 | A | | 11/1998 | Ravin ......................... 119/496 |

(Continued)

FOREIGN PATENT DOCUMENTS

GB 2184940 A * 7/1987

Primary Examiner—Teri Pham Luu
Assistant Examiner—Kimberly S. Smith
(74) Attorney, Agent, or Firm—Greer, Burns & Crain, Ltd

(57) ABSTRACT

A pet carrier for transporting an animal includes a floor panel having a substantially rigid bottom, a pair of side panels each having a lower edge and an upper portion, the lower edges of each side panel attached to opposite ends of the floor panel, and an arcuate top panel having a pair of oppositely located lateral edges, a pair of oppositely located ends, and an inner surface, the ends being fixedly attached to the floor panel and the lateral edges being releasably attached to the side panels. At least two arches are detachably engaged to the top panel inner surface and spaced above the floor panel, the arches being formed from a resiliently planar material and bent to conform with the arcuate top panel. An inflexible bar is positioned along an apex of the top panel inner surface for providing longitudinal stability to the carrier.

8 Claims, 6 Drawing Sheets

U.S. PATENT DOCUMENTS

| | | | |
|---|---|---|---|
| 5,927,581 A * | 7/1999 | Reddy et al. | 224/578 |
| 5,941,195 A | 8/1999 | Martz | 119/497 |
| 5,975,387 A * | 11/1999 | Gleason et al. | 224/148.2 |
| 6,021,740 A | 2/2000 | Martz | 119/497 |
| 6,076,485 A * | 6/2000 | Peeples et al. | 119/497 |
| 6,164,505 A * | 12/2000 | Holter et al. | 224/259 |
| 6,394,036 B2 * | 5/2002 | Burns et al. | 119/497 |
| 6,439,165 B1 * | 8/2002 | Guard | 119/496 |
| 2003/0205601 A1 * | 11/2003 | Kilduff | 224/627 |

\* cited by examiner

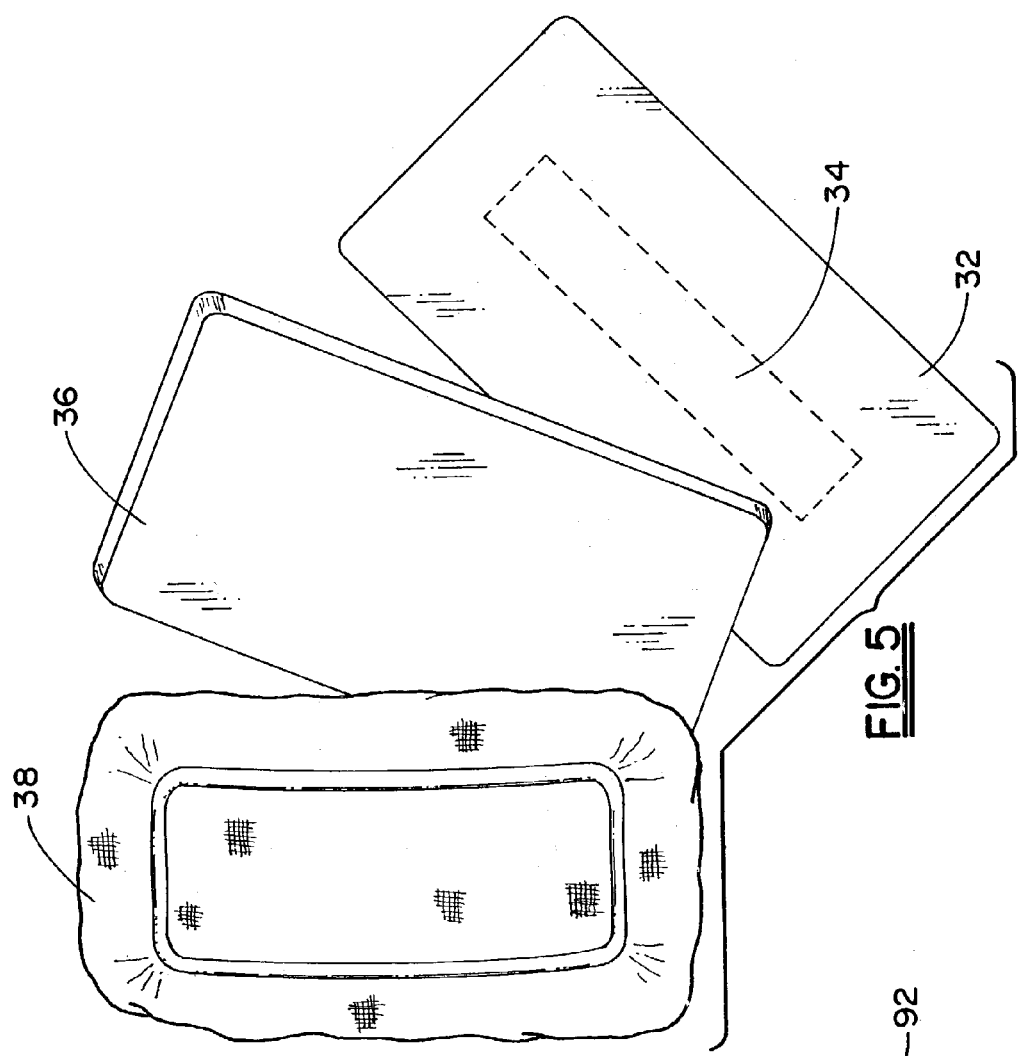
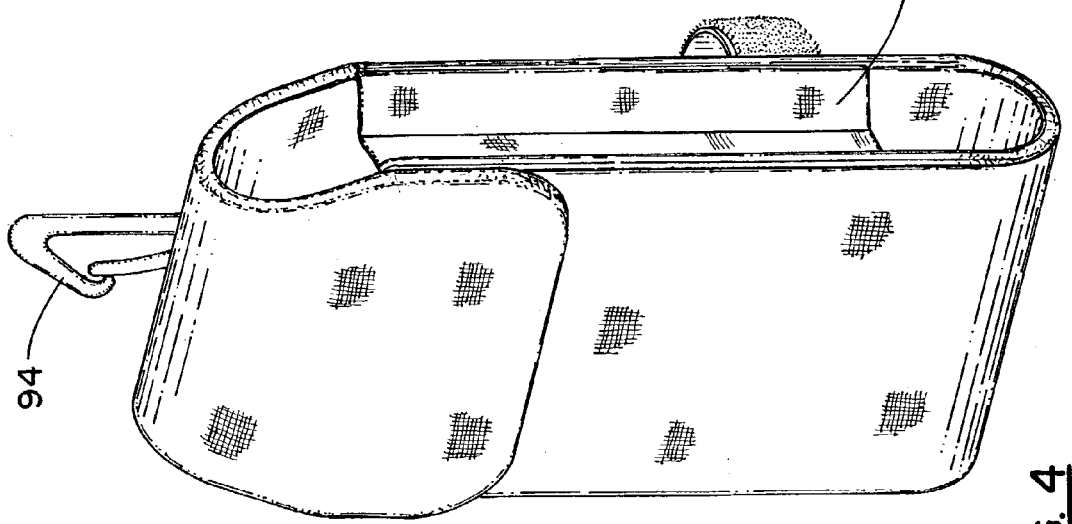

COMPRESSIBLE PET CARRIER

CROSS REFERENCE TO RELATED APPLICATION

The present application claims priority to U.S. Provisional Application Ser. No. 60/347,667 filed on Jan. 10, 2002.

BACKGROUND OF THE INVENTION

1. Field of Invention

The present invention relates to pet carriers and, more specifically, to a compressible pet carrier adapted for comfortable carriage by a pet owner.

2. Description of Prior Art

Pet owners have traditionally relied on rigid cages to contain pets while traveling. These cages are often bulky and difficult to move and they are not suitable for modern traveling conditions where limited space is available or for an active lifestyle, such as when jogging or rollerblading. Generally, these unwieldy carriers cannot be used if the pet owner is traveling by foot because they are too cumbersome to carry by hand and may have to be wheeled or placed on a trolley.

Lighter weight carriers made from flexible materials that are designed to be carried like a purse or shoulder bag have been designed for use by pet owners traveling on foot. These carriers, however, lack proper ventilation, do not allow access for water, are difficult to access, lack safety measures, and are not adaptable for safe and comfortable when traveling in a vehicle, such as an automobile or airplane. These carriers are also prone to becoming unbalanced because of the motion of the pet or the way the carrier must be transported. As these carriers must be held in one hand or worn over a single shoulder and pets can be quite heavy, carriage for any appreciable Lighter weight carriers made from flexible materials that are designed to be carried like a purse or shoulder bag have been designed for use by pet owners traveling on foot. These carriers, however, lack proper ventilation, do not allow access for water, are difficult to access, lack safety measures, and are not adaptable for safety and comfort when traveling in a vehicle, such as an automobile or airplane. These carriers are also prone to becoming unbalanced because of the motion of the pet or the way the carrier must be transported. In addition, the lack of a proper support structure can distort the interior room of the carrier, causing discomfort to the pet. As these carriers must be held in one hand or worn over a single shoulder and pets can be quite heavy, carriage for any appreciable distance often becomes tiring and the owner has to frequently shift the way that the carrier is held.

While pet carriers have been designed for use in cars or on airplanes, these carriers are typically very rigid and cannot fit into non-geometric spaces, such as under an airplane seat. As a result, the pet may often have to travel in the luggage compartment where conditions are often unsafe for animals. Those carriers that are designed from flexible materials are without any structural support to prevent collapse onto an enclosed pet and result in reduced interior space for the pet, a severe detriment during long transit periods.

3. Objects and Advantages

It is a principal object and advantage of the present invention to provide a pet carrier that is convenient to use and can be comfortably worn by a pet owner.

It is an additional object and advantage of the present invention to provide a pet carrier that has a flexible structure that can be compressed during use and collapsed for storage.

It is a further object and advantage of the present invention to provide a pet carrier that is safe for use when traveling in a vehicle.

It is another object and advantage of the present invention to provide a pet carrier that allows a pet to have adequate access to air and water.

Other objects and advantages of the present invention will in part be obvious, and in part appear hereinafter.

SUMMARY OF THE INVENTION

In accordance with the foregoing objects and advantages, the present invention provides a flexible pet carrier having a support structure, a leveling system and climate control compartment that is convenient to use and can be comfortably worn by a pet owner. The pet carrier comprises a flexible enclosure formed from a series of interconnected panels supported by removable stiffening members. A transverse beam stiffener extends longitudinally along the roof panel and cooperates with a pair of transverse support members removably attached to either end of the enclosure. The support members are preferably semi-rigid plastic pieces that are flat or planar and can be flexed by the application of force. A user inserts the transverse support members by bending them into an arch, inserting into the enclosure, and engaging them into place via a series of fasteners. The support members then flex outwardly to assist in supporting the roof of the enclosure. As the support members are semi-rigid, the roof of the enclosure may be resiliently deformed as needed, such as for placing the carrier under a passenger airline seat. Further flexibility is achieved by disengaging one or more of the fasteners, thereby reducing the height of the enclosure without fully collapsing the unit. Removal of the support members allows a user to collapse the pet carrier to a substantially flat configuration.

The pet carrier of the present invention further comprises a detachable shoulder strap system for carrying the pet carrier like a backpack and a leveler for balancing the carrier when worn by the user. The leveler includes a pair of front extension straps having two ends, wherein each front extension strap is attached at one end to a respective end of the shoulder straps. Each of the front extension straps extends over the roof of the enclosure and the other end of the strap is removably attached to the front side of the enclosure. An adjusting mechanism is provided on each front extension strap for adjusting the length of the strap to level the floor of the enclosure when carried by the user.

The pet carrier of the present invention also comprises an air conditioning compartment attached to the inside portion of the roof of the enclosure. At least a portion of the air conditioning compartment is located in the interior of the enclosure, and at least one opening, such as a mesh panel, allows air to flow between the compartment and the interior of said enclosure. Preferably, access doors to the compartment are also provided within the roof of the enclosure and on one side of the compartment. The compartment can optionally hold a means for conditioning the air within said enclosure, such as a heating or cooling pad, an odor remover, or an air freshener.

BRIEF DESCRIPTION OF THE DRAWINGS

FIG. 4 is a perspective view of an accessory item for use with shoulder strap system of the present invention.

FIG. 5 is an exploded view of a bottom panel of the pet carrier of the present invention.

DETAILED DESCRIPTION

Figure 1:
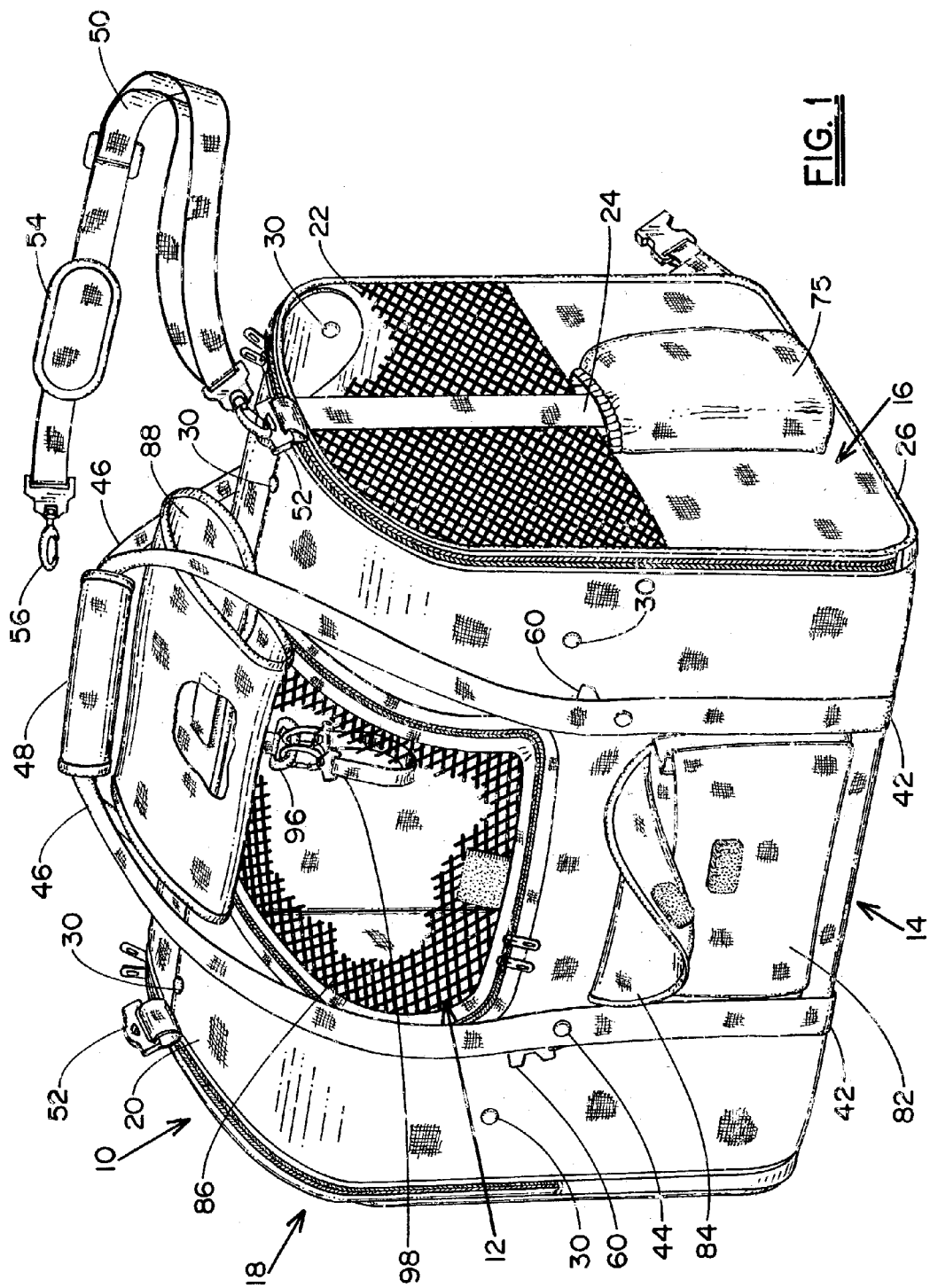
FIG. 1 is a front perspective view of a pet carrier according to the present invention.

Referring now to the drawings in which like numerals refer to like parts throughout, there is seen in FIG. 1 a pet carrier 10 according to the present invention generally comprising an enclosure 12 formed from a series of flexible panels preferably formed from a waterproof or water resilient fabric. Panels include a floor panel 14, two side panels 16 and 18 attached along their lower edges to floor 14, and an arcuate top panel 20 fixedly attached along either end to floor panel 14 and releaseably attached along its lateral edges to side panels 16 and 18. Panels may be interconnected via stitching or other means for fixedly attaching fabric panels together and it should be recognized by one of skill in the art that any number of individual panels may be interconnected together in to form the various elements of enclosure 12. Panels are preferably formed from two- or three-ply material containing a soft padding and have a water-resistant coating. Panels may also contain semi-rigid plastic sheets between the plies in areas that need additional reinforcement.

Side panels 16 and 18 are releasably attached to top panel 20 and fixedly attached to floor panel 14, such as by a double-headed zipper provided that zipper does not allow zipper heads to slide backward when force is applied from inside enclosure 12 by a pet. In order to prevent leaks of pet droppings and meet aviation transportation requirements for cargo shipping (no such requirements are known for travel in the cabin area), the releasable portion of both side panels 16 and 18 should begin at least one inch above seam with floor panel 14.

Side panels 16 and 18 preferably contain netted windows 22 in their upper portion, thereby enabling ventilation and visibility into and out of enclosure 12. Side panels 16 and 18 preferably contain at least one-half solid material to provide sufficient strength. Additional webbing 24 may be sewn along the middle of windows 22 in side panels 16 and 18 to improve structural integrity. The seams between side panels 16 and 18 and floor panel 14 or top panel 20 may additionally contain piping 26 with plastic wire for reinforcement.

Figure 6:
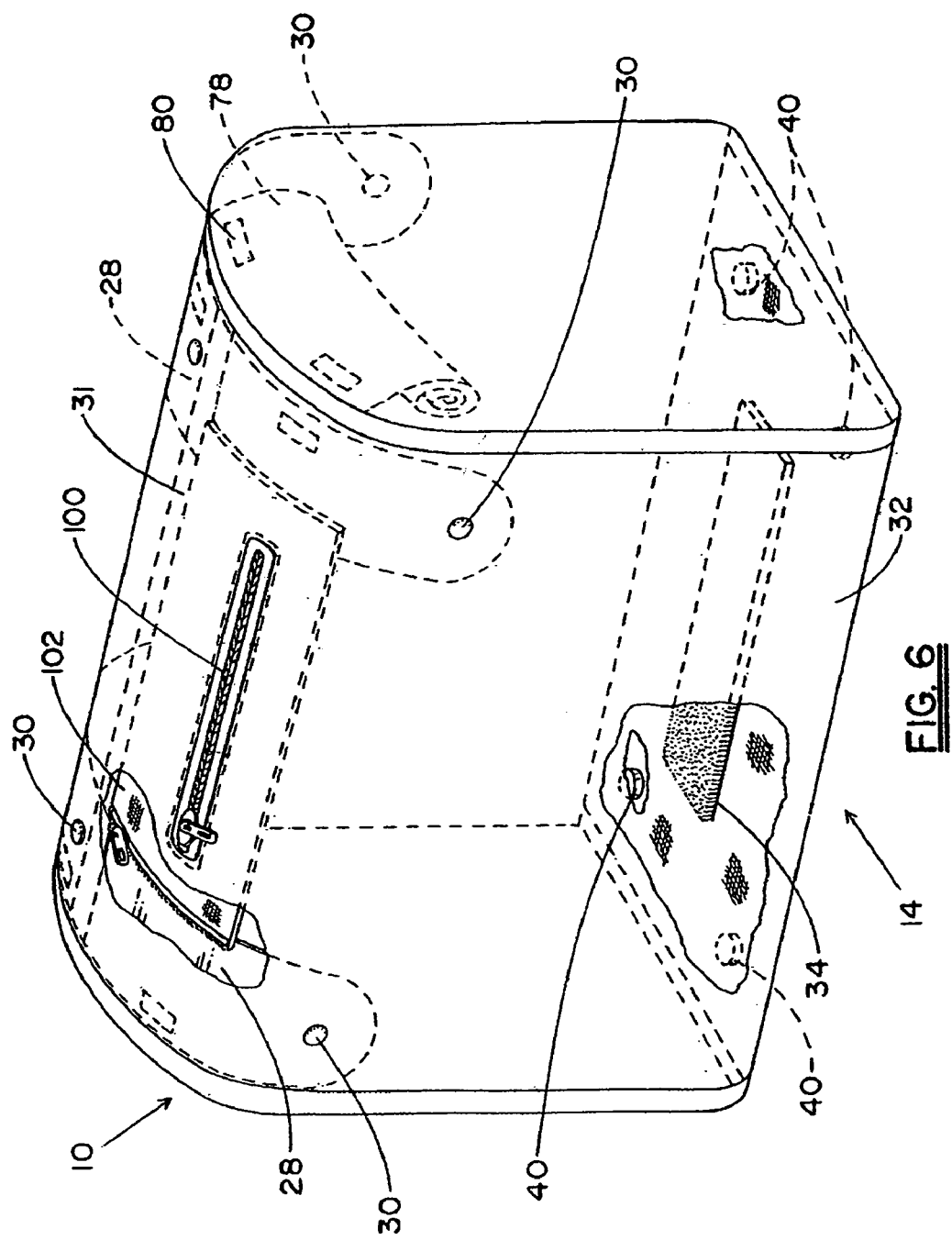
FIG. 6 is a rear perspective view of the pet carrier of the present invention.

As seen in FIG. 6, the structural integrity of carrier 10 is maintained by a system of resilient members that engage the material forming the outer surface of carrier 10. Two arches 28 are removably engaged to the inner surface of top 20 via a row of fasteners 30, such as snaps. Arches 28 are formed by inserting a resilient planer material, such as a plastic sheet, into enclosure 12, bending the material into an arcuate shape, and then snapping the material into place. The resiliency of arches 28 insures that top panel 20 is maintained in an arcuate shape, yet allows for carrier 10 to be flexible. Additionally, removal of arches 28 allows carrier 10 to be nearly completely flattened for storage or transport when a pet is not inside enclosure 12. An inflexible bar 31, such as an aluminum rod, is positioned along the apex of top panel 20 to provide longitudinal stability to carrier 10. Less rigid material, such as plastic, may be used instead of aluminum for a smaller carrier.

The rigidity of floor panel 14 is accomplished by a rigid bottom 32 having a strip of adhesive 34, such as VELCRO®, for releasable attachment to a tray 36 (FIG. 5). Tray 36 may have a rim for containing fluids, thus avoiding the need for the one inch margin between the releasable portion of side panels 16 and 18 and floor panel 14. As seen in FIG. 5, tray 36 contains a washable pad 38 releasably attached to tray 36. Referring back to FIG. 6, four studs 40 are interconnected through floor panel 14 to bottom 30 and extend outwardly from carrier 10. Wheels (not shown) may be attached to floor panel 14 in lieu of studs 40.

The transport of carrier 10 may be accomplished by at least three separate systems, which may be used individually or in concert. As seen in FIG. 1, two rows of handle webbing 42 are secured to front and back of carrier 10 along the lower portions of top panel 20. Handle webbing 42 is sewn or stitched directly to floor panel 14 and the lower portion of top panel 20, and is further secured by a rivet 44 at the point where it detaches from top 20. Rows of handle webbing 42 extend outwardly and independently from carrier 10 at rivet 44 and interconnect on either side of carrier 10 to form a pair of opposing handles 46. A padded hand strap 48 may be secured around handles 46 by releasable means, such as VELCRO®, to keep handles 46 together and improve user comfort.

Carrier 10 may also be transported by engaging an adjustable shoulder strap 50 to D-rings 52 positioned on either side of the upper most portion of top panel 20. Shoulder strap 50 preferably contains a padded cushion 54 and a pair of tangle-free swivel hooks 56 for attachment to D-rings 52.

Figure 2:
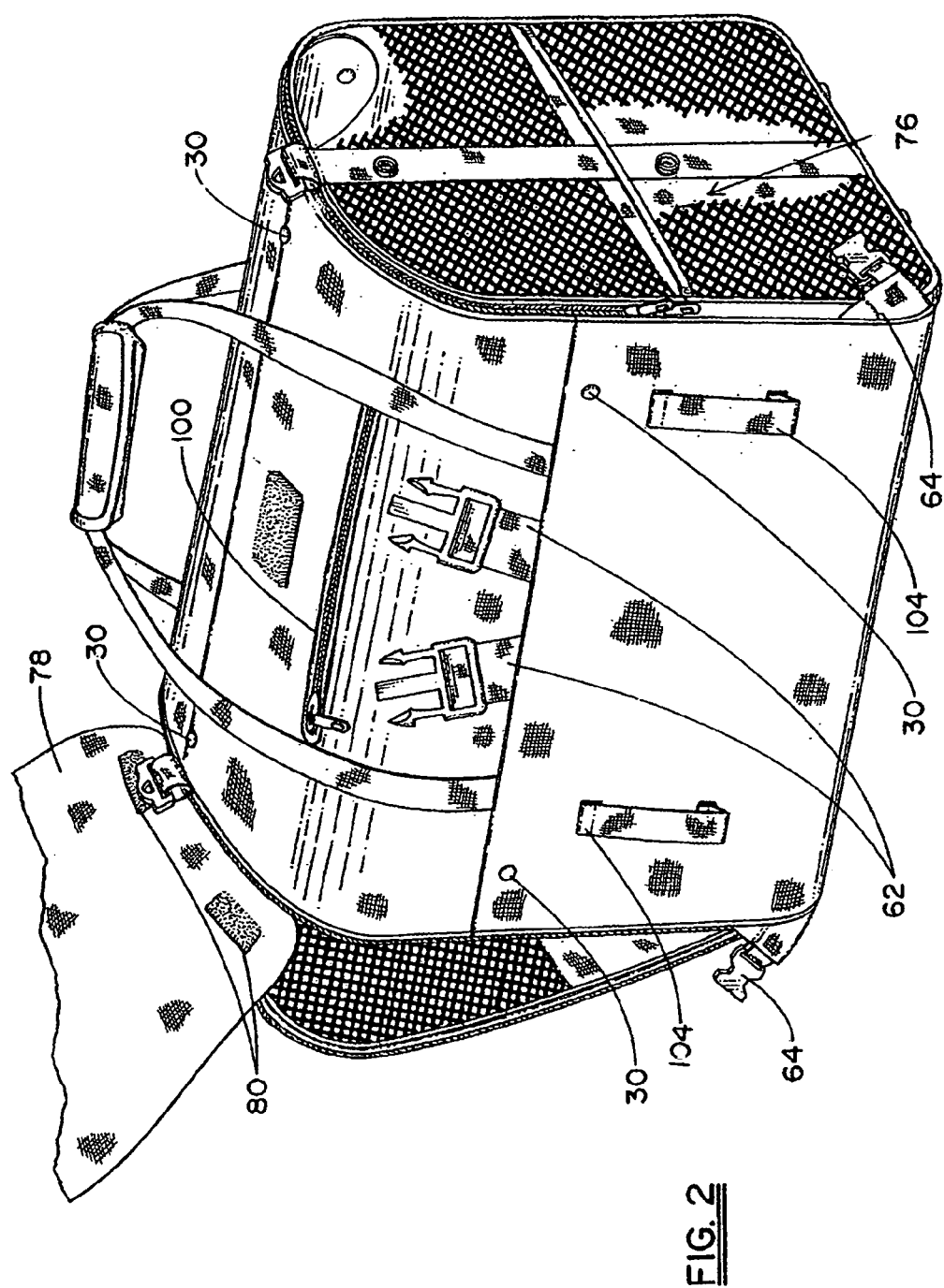
FIG. 2 is a rear perspective view of a pet carrier according to the present invention.
Figure 3:
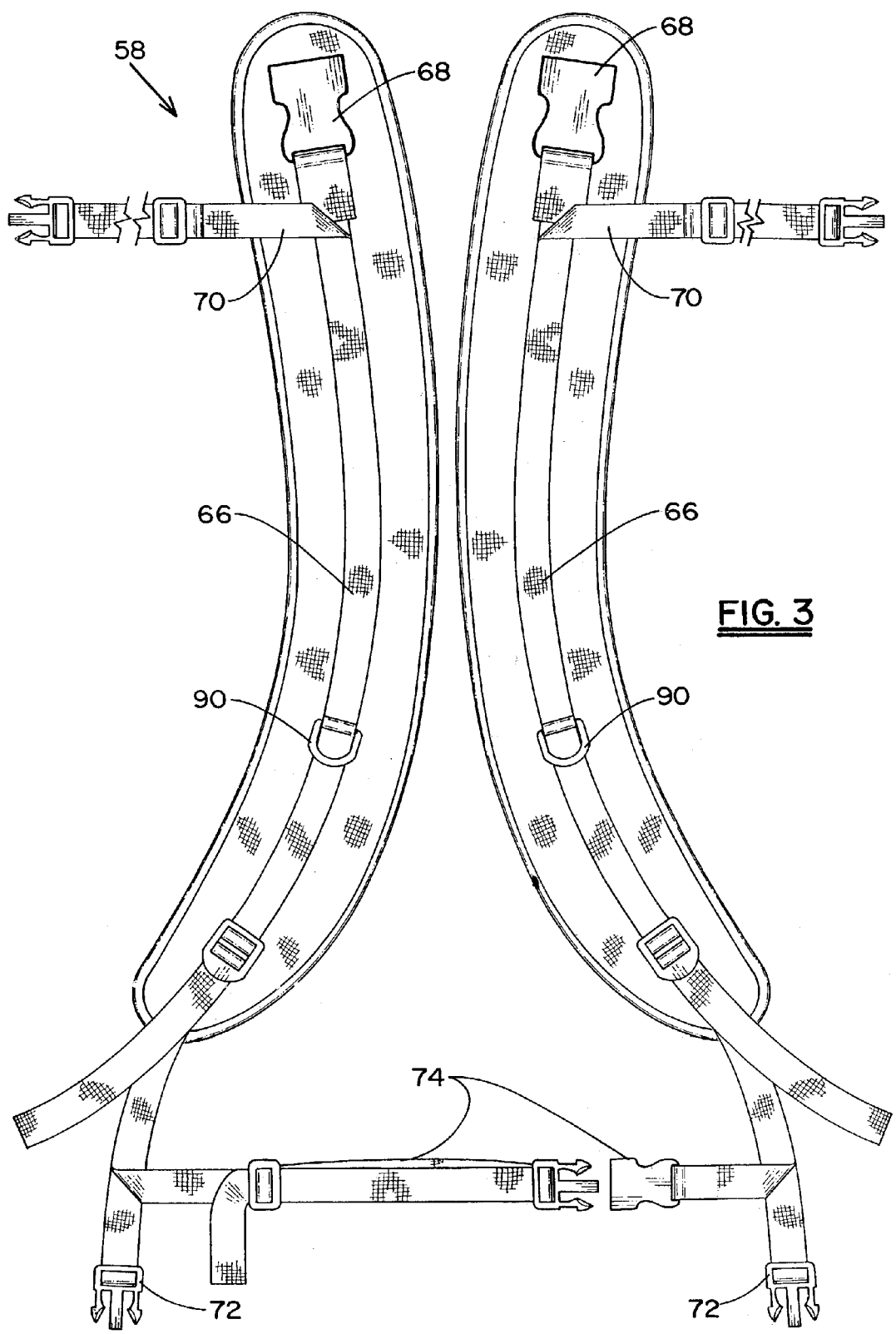
FIG. 3 is a plan view of the shoulder strap system of the present invention.

Referring to FIG. 3, carrier 10 may also be transported by a backpack system 58 that is engageable with carrier 10. As seen in FIG. 1, the front side of carrier 10 contains two front buckles 60 positioned beneath webbing 42. As seen in FIG. 2, the rear side of carrier 10 contains a pair of upper strap buckles 62 attached to an intermediate portion of top panel 20 and two waist buckles 64 positioned on the lowermost portion of top panel 20 proximate to side panels 16 and 18 and floor panel 14.

Figure 7:
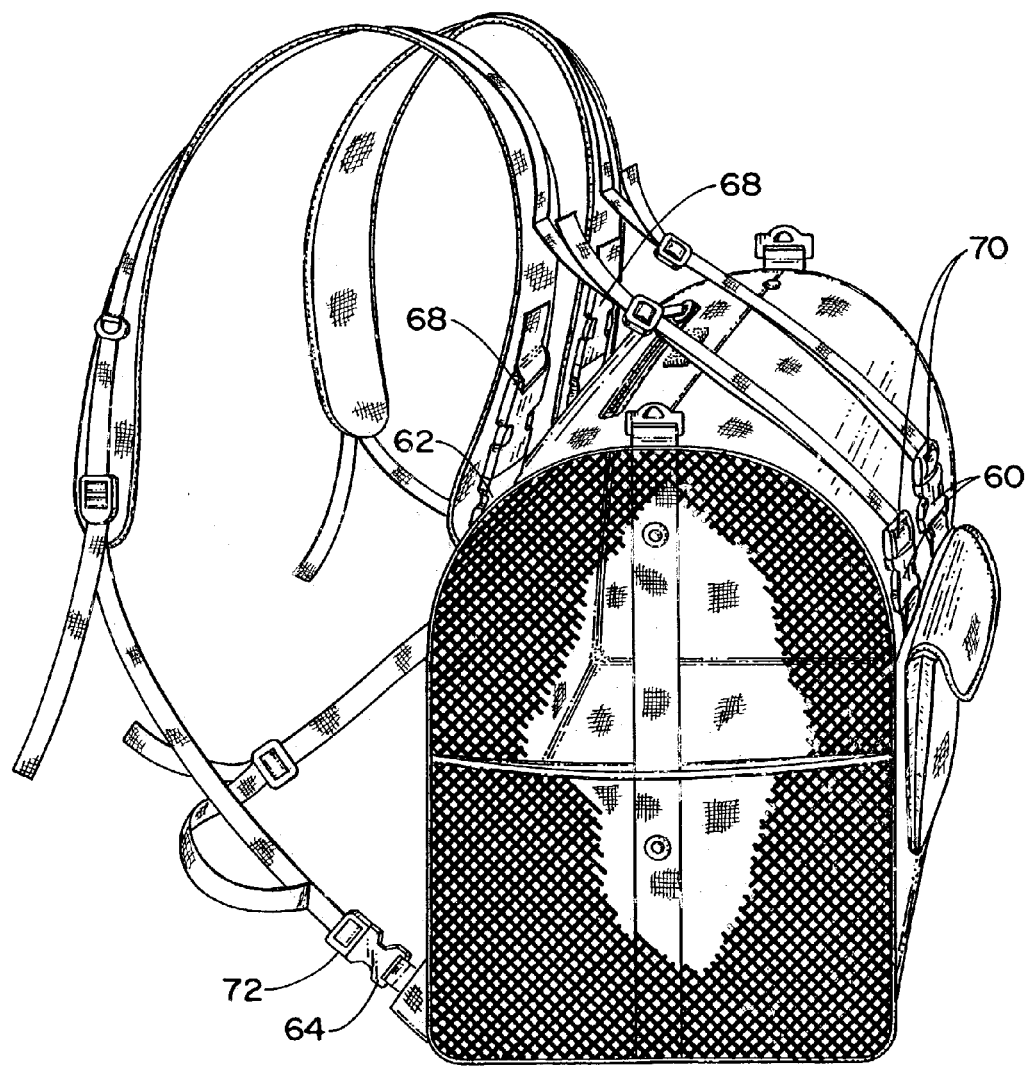
FIG. 7 is a side perspective view of a pet carrier and the shoulder strap system according to the present invention.

As seen in FIG. 3, backpack system 58 comprises two adjustable straps 66 having two sets of buckles 68 and 70 at one end and a single set of buckles 72 at the opposite ends. As seen in FIG. 7, the two sets of buckles 68 and 70 are engageable with upper strap buckles 62 on the rear of carrier 10 and front buckles 60 on the front of carrier 10, respectively. Single set of buckles 72 is engageable with waist buckles 64 on the rear of carrier 10. Referring back to FIG. 3, backpack system 58 additionally includes an adjustable waist strap 74 that is attached to and interconnects the ends of straps 66 having single set of buckles 72. The six points of connection to carrier 10 provided by backpack system 58 allows carrier 10 to be maintained in a level position when worn by a pet owner by adjusting the length of the various straps accordingly.

Carrier 10 also includes various elements for improving the convenience and ease by which pets and pet related paraphernalia are transported. As seen in FIG. 1, a water bottle holder 75 may be provided on a portion of side panel 16 below mesh window 22. Holder 75 preferably contains an elastic opening sized to accommodate and secure conventionally sized drink bottles. An additional elastic strap (not shown) may be positioned above holder 75 to retain a water bottle in place and a small opening (not shown) into enclosure 12 may be provided to allow a pet to access the water bottle in holder 75.

As seen in FIG. 2, a mesh pocket 76 with an elastic opening may be provided on the exterior surface of side panel 18. As seen in FIG. 6, flexible curtains 78 may be positioned on the inside surface of enclosure 12. Curtains 78 can be rolled up and down and held in either position by VELCRO® strips 80.

As seen in FIG. 1, carrier 10 may also comprise a large pocket 82 with a releasable cover 84 positioned on the front surface of top panel 20 for the storage of additional materials, such as a can of pet food, a leash, treats, or similar items. An intermediate portion of top panel 20 may further include a mesh window 86 and corresponding flap 88 having a strip of VELCRO® for fastening in an open or closed position. Mesh window 86 is preferably positioned in the upper portion of top panel 20 to allow visibility into and out of enclosure 12. Mesh window 86 is particularly useful when carrier 10 is placed underneath a seat, such as on an airplane, or when strapping in an adjoining seat, such as in an automobile. Mesh window 86 may be releasably attached to top panel along one or more sides by a double zipper or the like which allows access to enclosure 12 but does not allow a pet to force the zipper open from the inside. Flap 88 should be slightly larger than opening formed by window 86 to prevent the entry of precipitation into enclosure 12.

Backpack system 58 may further include D-rings 90 (FIG. 3) for attaching accessories, such as a cellular phone pouch or waste bag pouch. As seen in FIG. 4, an accessory pouch 92 adapted for attachment to system 58 includes a tangle free, 360 degree swivel hook 94 for attachment to D-rings 90.

As seen in FIG. 1, a D-ring 96 is permanently attached or sewn to the interior of carrier 10, preferably onto the inner surface of top panel 20, and a leash 98 is secured to D-ring 96. The leash preferably has a tangle free swivel hook at both ends and is adjustable to various lengths to restrain a pet inside enclosure 12 while allowing limited movement when any one of mesh window 88, side panel 16, or side panel 18 are open.

As seen in FIGS. 2 and 6, top panel 20 further comprises a zippered opening 100 that communicates with a pouch 102 positioned on the inside of top panel 20 to allow for the insertion of a heating pad, a cooling pad, an air freshener, or an odor remover (not shown). Pouch 102 can optionally used for storage of personal items. Rear portion of top panel 20 may further contain a storage compartment having a releasable flap and various of pouches or holders designed for holding personal items, such as stationary supplies pens or pencils. Rear portion of top panel 20 may also include a pair of loops 104 (FIG. 2) for attachment to an adjustable bicycle handle, car seat belt, or luggage rack.

What is claimed is:

1. A pet carrier for transporting an animal comprising:
   a floor panel having a substantially rigid bottom;
   a pair of side panels each having a lower edge and an upper portion, said lower edge of each side panel attached to opposite ends of said floor panel;
   an arcuate top panel having a pair of oppositely located lateral edges, a pair of oppositely located ends, and an inner surface, said ends being fixedly attached to said floor panel and said lateral edges being releasably attached to said side panels, said floor, side and top panels forming an enclosure for the animal; and
   at least two arches detachably fastened to said top panel inner surface and extending from an apex of said top panel and terminating at a point midway between said substantially rigid bottom and said apex, said arches being spaced apart from said side panels, said arches being flexible, resilient members bent to conform with said arcuate top panel.

2. The pet carrier of claim 1 further including a pair of handles located on opposite sides of said top panel.

3. The pet carrier of claim 1 further including an adjustable shoulder strap releasably attached to a pair of oppositely located connectors on said top panel apex.

4. The pet carrier of claim 1 further including a backpack system having adjustable strap means for leveling said floor panel when in use.

5. The pet carrier of claim 1 wherein said carrier further includes handles, an adjustable shoulder strap, and a backpack system.

6. A collapsible pet carrier for transporting an animal comprising:
   a floor panel having a substantially rigid bottom;
   a pair of side panels each having a lower edge and an upper portion, said lower edge of each side panel attached to opposite ends of said floor panel;
   an arcuate top panel having a pair of oppositely located lateral edges, a pair of oppositely located ends, and an inner surface, said ends being fixedly attached to said floor panel and said lateral edges being releasably attached to said side panels, said floor, side and top panels forming an enclosure for the animal;
   at least two arches detachably fastened to said top panel inner surface and being removable from said pet carrier, said arches extending from an apex of said top panel and terminating at a point midway between said substantially rigid bottom and said apex; and
   an inflexible bar positioned along said apex of said top panel, said inflexible bar being fixed to said apex of said top panel but not fixed to said arches.

7. The compressible pet carrier of claim 6 further including a backpack system having adjustable straps for leveling said floor panel when in use.

8. The compressible pet carrier of claim 6 wherein said enclosure further includes a pouch having a zippered opening for receiving one of a heating pad, a cooling pad, an air freshener, or an odor remover.

* * * * *

UNITED STATES PATENT AND TRADEMARK OFFICE
CERTIFICATE OF CORRECTION

PATENT NO. : 7,210,426 B2 Page 1 of 1
APPLICATION NO. : 10/339746
DATED : May 1, 2007
INVENTOR(S) : Angie Yeung It is certified that error appears in the above-identified patent and that said Letters Patent is hereby corrected as shown below:

On the Title page: item 60

Under Related U.S. Application data, delete "Jan. 10, 2001" and insert -- Jan. 10, 2002 --.

In the Specification:

Column 1, Lines 24-35, delete entire paragraph.

Signed and Sealed this

Seventh Day of August, 2007

JON W. DUDAS
*Director of the United States Patent and Trademark Office*